(12) United States Patent
Hanano et al.

(10) Patent No.: US 7,988,366 B2
(45) Date of Patent: Aug. 2, 2011

(54) RETAINER FOR ROLLING BEARING AND ROLLING BEARING

(75) Inventors: Masayuki Hanano, Mino (JP);
Tsutomu Mizutani, Kuwana (JP);
Ryutarou Oka, Kuwana (JP)

(73) Assignee: NTN Corporation, Osaka (JP)

( * ) Notice: Subject to any disclaimer, the term of this patent is extended or adjusted under 35 U.S.C. 154(b) by 612 days.

(21) Appl. No.: 11/988,883

(22) PCT Filed: Jul. 20, 2006

(86) PCT No.: PCT/JP2006/314377
§ 371 (c)(1),
(2), (4) Date: Feb. 25, 2008

(87) PCT Pub. No.: WO2007/010982
PCT Pub. Date: Jan. 25, 2007

(65) Prior Publication Data
US 2010/0092121 A1 Apr. 15, 2010

(30) Foreign Application Priority Data
Jul. 21, 2005 (JP) ................. P2005-211764

(51) Int. Cl.
*F16C 33/44* (2006.01)
(52) U.S. Cl. ..................... 384/527; 384/625
(58) Field of Classification Search .......... 384/444, 384/527, 625, 912; 148/243, 247, 260, 264; 428/328, 472, 626
See application file for complete search history.

(56) References Cited

U.S. PATENT DOCUMENTS

| 2,106,904 | A | * | 2/1938 | Wilhelm | 148/264 |
| 4,643,778 | A | * | 2/1987 | Donofrio | 148/247 |
| 5,242,714 | A | * | 9/1993 | Steele et al. | 427/379 |
| 6,183,570 | B1 | * | 2/2001 | Kawaguchi et al. | 148/243 |
| 6,200,672 | B1 | * | 3/2001 | Tadokoro et al. | 428/328 |
| 7,172,342 | B2 | * | 2/2007 | Oda et al. | 384/488 |
| 2003/0190105 | A1 | * | 10/2003 | Ueda et al. | 384/527 |
| 2003/0232146 | A1 | * | 12/2003 | Iwade et al. | 427/405 |
| 2004/0197594 | A1 | * | 10/2004 | Suzuki et al. | 428/626 |
| 2005/0179010 | A1 | * | 8/2005 | Lin | 252/387 |

FOREIGN PATENT DOCUMENTS

| JP | 62173003 A | * | 7/1987 |
| JP | 01-295022 | | 11/1989 |
| JP | 08257601 A | * | 10/1996 |
| JP | 08325789 A | * | 12/1996 |
| JP | 09-088974 | | 3/1997 |
| JP | 2002-357227 | | 12/2002 |
| JP | 2003-003270 | | 1/2003 |
| JP | 2005002373 A | * | 1/2005 |

* cited by examiner

*Primary Examiner* — Marcus Charles
(74) *Attorney, Agent, or Firm* — Hedman & Costigan, P.C.; James V. Costigan

(57) ABSTRACT

The present invention provides a rolling bearing which does not contain a hazardous substance and thus does not pollute environment. The present invention also provides a retainer, for holding rolling elements of the rolling bearing, which is made of a cold rolled steel plate. The retainer is subjected to at least one kind of surface treatment selected from among electrogalvanizing, electrotinning, electrolytic tin-zinc alloy plating, electrolytic zinc-iron alloy plating, and electrolytic zinc-nickel alloy plating. The retainer is further chromated with trivalent chromium. The rolling bearing uses the retainer for the rolling bearing.

8 Claims, 4 Drawing Sheets

US 7,988,366 B2

RETAINER FOR ROLLING BEARING AND ROLLING BEARING

BACKGROUND OF THE INVENTION

1) Field of the Invention

The present invention relates to a retainer for a rolling bearing and the rolling bearing which do not pollute environment.

2) Description of Related Art

In a conventional rolling bearing, particularly in a ball bearing, as a metal plate for a metal retainer, an electrolytic zinc alloy-plated steel plate excellent in its rust-preventive property is used. The electrolytic zinc alloy-plated steel plate is composed of a primary surface film formed by electrolytically treating a cold rolled steel plate which is the matrix of the retainer with a treating liquid containing zinc as its main component and molybdenum, cobalt or the like and a secondary surface film formed by electrolytically treating the primary surface film with hexavalent chromate.

But the electrolytic zinc alloy-plated steel plate contains hazardous hexavalent chromium. Therefore there is a fear that in maintenance such as disassembly, inspection, cleaning, and the like of the rolling bearing, hazardous substances including the hexavalent chromium flow out of the electrolytic zinc alloy-plated steel plate and contaminate an operator and damage operator's health. Thus the electrolytic zinc alloy-plated steel plate has a problem that it pollutes environment, which makes it difficult to use it.

Restriction of Hazardous Substances order (RoHS order) restricting the use of the six specified hazardous substances contained in electric and electronic apparatuses has become effective in 15 countries affiliated with the EU (European Union). The RoHS order prohibits the use of lead, hexavalent chromium, mercury, cadmium, a bromine-based fire-retardance agent (PBB (polybromobiphenyl) and PBDE (polybromodiphenyl ether)) for about 70 electric and electronic products which will be sold in the EU member countries after July in 2006. With the effectuation of the RoHS order in Europe, in all-around electric appliance makers, there is a movement of applying the use restriction of the six specified hazardous substances which pollute environment to their products.

To solve this problem, a method of treating the surface of a metal plate which is used for a sealing device of the rolling bearing including chromating with trivalent chromium is known (patent document 1).

In many cases, the retainer for the rolling bearing and the rolling bearing are used with grease enclosed therein. Thus in many cases, the characteristic of the rolling bearing is determined by the grease enclosed therein. Therefore the suitability of the enclosed grease for the surface-treated metal member is very important. But the suitability of the enclosed grease for the chromated metal member has not been investigated.

The grease-enclosed bearing is cleaned at the time of maintenance of the rolling bearing. In cleaning the grease-enclosed bearing, there is a case in which the chromated surface layer peels off. The relationship between the chromating with trivalent chromium and the cleaning performance has not been investigated.

Patent document 1: Japanese Patent Application Laid-Open No. 2002-357227

DISCLOSURE OF THE INVENTION

Problems to be Solved by the Invention

The present invention has been made to cope with the above-described problems. It is an object of the present invention to provide a retainer for a rolling bearing and the rolling bearing which do not contain a hazardous substance and thus do not pollute environment.

Brief Summary of the Invention

A retainer for a rolling bearing of the present invention is made of a metal and retains rolling elements of the rolling bearing. The metal is cold rolled steel chromated with trivalent chromium after rust-preventive treatment is applied to a surface thereof.

The rust-preventive treatment is at least one kind of surface treatment selected from among electrogalvanizing, electrotinning, electrolytic tin-zinc alloy plating, electrolytic zinc-iron alloy plating, and electrolytic zinc-nickel alloy plating.

After the rust-preventive treatment, the chromating with trivalent chromium is performed by cleaning the metal with water, immersing the metal in a solution of nitric acid, cleaning the metal with water again, immersing the metal in a trivalent chromium bath, and drying the metal.

The rolling bearing of the present invention has an inner ring having a rolling surface on a peripheral surface thereof; an outer ring concentric with the inner ring and having a rolling surface thereof on an inner peripheral surface thereof; and a plurality of rolling elements disposed between the inner and outer ring rolling surfaces; and a retainer holding the plurality of rolling elements.

The retainer is the above-described retainer for the rolling bearing.

The rolling bearing is used for industrial machines.

The industrial machines include a railway vehicle, a steel rolling machine, a machine tool, and a motor.

Effect of the Invention

Because the retainer for the rolling bearing of the present invention is composed of the metal plate not containing the hazardous hexavalent chromium, the hazardous hexavalent chromium does not elute from the rolling bearing provided with the retainer and thus the retainer does not pollute environment.

DETAILED DESCRIPTION OF THE INVENTION

Energetic investigations have been made to provide a retainer for a rolling bearing which does not contain a hazardous substance such as hexavalent chromium and thus does not pollute environment. As a result, the present inventors have used trivalent chromium in chromating as a secondary surface treatment instead of using hexavalent chromium after performing primary surface treatment of zinc-plating the cold rolled steel plate which is the matrix of the retainer, and they have found that rust-preventive performance is secured and chromium does not flow out to grease. By using the trivalent chromium instead of the hexavalent chromium in performing the secondary surface treatment on the cold rolled steel plate which is the matrix of the retainer, it is possible to obtain the retainer for the rolling bearing which does not contain hazardous substance and thus does not pollute environment. The present invention is based on the above-described finding.

Regarding the primary surface treatment applied to the cold-rolled steel sheet which is the matrix of the retainer, treatment by electrogalvanizing, electrotinning, electrolytic tin-zinc alloy plating, electrolytic zinc-iron alloy plating, and electrolytic zinc-nickel alloy plating are listed.

The electrogalvanizing is a method of surface-treating the cold rolled steel plate by immersing it in a zinc sulfate plating bath, a zinc chloride plating bath, or the like. By using a treating liquid to which a trace element such as molybdenum, cobalt or the like is added as a plating bath, a zinc-plated film containing the trace element is formed. Thereby corrosion resistance is improved.

The electrotinning is a method of surface-treating the cold rolled steel plate by immersing it in an acidic tin plating bath such as a fluoroboric acid bath, a sulfuric acid bath, an alkane sulfonic acid bath, an alkanol sulfonic acid bath, and phenol-sulfonic acid bath or in an alkali metal tin plating bath such as a sodium bath, a potassium bath, and the like. By this treatment, a tin-plated film is formed on the surface of the cold rolled steel plate. The electrotinning shows corrosion resistance superior to that of the electrogalvanizing and almost the same degree of corrosion resistance as that of the electrolytic zinc alloy plating.

The electrolytic tin-zinc alloy plating is corrosion-resistant plating carried out in combination of sacrifice corrosion resistance of zinc and excellent corrosion resistance of tin lower than iron in the ionization tendency. It is preferable to set the ratio between the zinc and the tin to about 3:7 in view of the balance of the corrosion resistance. The electrolytic tin-zinc alloy plating is a method of surface-treating the cold rolled steel plate by immersing it in a silicon fluoride bath, a boron fluoride bath, a sulfonate bath, a phenol sulfonate bath, the alkanol sulfonic acid bath, the alkane sulfonic acid, and the like. By this treatment, a tin-zinc alloy plated film is formed on the surface of the cold rolled steel plate. The electrolytic tin-zinc alloy plating shows corrosion resistance superior to that of the electrogalvanizing and shows almost the same degree of corrosion resistance as that of the electrolytic zinc alloy plating.

In the electrolytic zinc-iron alloy plating, the ratio between the zinc and the iron is 99.3 to 99.8%:0.2 to 0.7%. The electrolytic zinc-iron alloy plating shows the best corrosion resistance when the ratio of the iron is 0.4%. The electrolytic zinc-iron alloy plating is a method of surface-treating the cold rolled steel plate by immersing it in a zincate bath or the like. By this treatment, a zinc-iron alloy plated film is formed on the surface of the cold rolled steel plate. The electrolytic zinc-iron alloy plating shows corrosion resistance superior to that of the electrogalvanizing and shows almost the same degree of corrosion resistance as that of the electrolytic zinc alloy plating.

In the electrolytic zinc-nickel alloy plating, the ratio between the zinc and the nickel is 80 to 95%:5 to 20%. Because the electrolytic zinc-nickel alloy plating contains the nickel having a high corrosion resistance, the electrolytic zinc-nickel alloy plating shows corrosion resistance superior to that of zinc plating. As the content of the nickel increases, the corrosion resistance becomes higher and thus the cost becomes higher. The electrolytic zinc-nickel alloy plating is a method of surface-treating the cold rolled steel plate by passing it through an ammonium chloride bath or the like. By this treatment, a zinc-nickel alloy plated film is formed on the surface of the cold rolled steel plate. The electrolytic zinc-nickel alloy plating shows corrosion resistance superior to that of the electrogalvanizing and the electrolytic zinc alloy plating, although the degree of the corrosion resistance thereof is dependent on the content of the nickel.

Of these primary surface-treating method, it is preferable to perform galvanizing treatment for the cold rolled steel plate because the galvanizing treatment is excellent in its adhesiveness to the cold rolled steel plate which is the matrix of the retainer, the adhesiveness to a trivalent chromium film formed in the secondary surface treatment, fastness properties of the trivalent chromium film, and workability in forming the film and advantageous in terms of the cost, the protection of environment, and rust-preventive property.

It is favorable that in the present invention, the average coating weight (one surface) of the primary surface film of the cold rolled steel plate is 2 to 25 g/m$^2$.

When the average coating weight is more than 25 g/m$^2$, the corrosion resistance of the cold rolled steel plate is improved but the cost required to perform the surface treatment increases. When the average coating weight is less than 2 g/m$^2$, the surface film is so thin that the generation probability of a pin hole increases and there is a possibility that rust is generated from the pin hole. Consequently the primary surface film of the cold rolled steel plate becomes insufficient and has a low practicability. Therefore in view of the balance of the corrosion resistance and the cost, it is more favorable that the average coating weight is in the range of 2.5 to 12 g/m$^2$.

It is preferable that surface roughness Ra of the metal plate obtained by surface-treating the cold rolled steel plate is set to the range of 0.2 to 1.5 μm. When the surface roughness Ra is more than 1.5 μm, post treatment such as dull finish is required to decrease the surface roughness. When the surface roughness is less than 0.2 μm, the cost required to increase the surface roughness is high and the thickness of the surface film becomes nonuniform, which deteriorates the corrosion resistance. To obtain a sufficient corrosion resistance, it is preferable to set the surface roughness to the range of 0.25 to 1.0 μm.

The secondary surface treatment of the present invention by chromating with trivalent chromium means the surface treatment of forming a thin film of the chromate of the trivalent chromium to impart a higher corrosion resistance to the retainer to which the primary surface treatment has been applied. The primary surface treatment of the cold rolled steel plate performed by using zinc plating as a representative rust-preventive plating method is utilized in a wide range of fields and very effective for preventing iron from rusting. But the surface of the cold rolled steel plate which has undergone only the primary surface treatment is generally liable to change color and corrode. Thus after the primary surface treatment is performed, chromating is performed as the secondary surface treatment to form the trivalent chromate film on the primary surface film as the secondary surface film.

The film of the trivalent chromate can be formed as the secondary surface film on the primary surface film of the cold rolled steel plate by passing the cold rolled steel plate which has undergone the primary surface treatment through a trivalent chromium bath containing chromium sulfate (III) or chromium chloride (III) as its base.

More specifically, in chromating with trivalent chromium, after the cold rolled steel plate is plated with zinc, it is cleaned with water and immersed in a nitric acid solution. After the cold rolled steel plate is cleaned with water again, it is immersed in a trivalent chromium bath and dried.

FIG. 1 shows one example of the construction of the retainer for the rolling bearing of the present invention.

FIG. 1 is a partly enlarged perspective view of a corrugated iron plate retainer. A retainer 5 for a rolling bearing is produced by combining two parts 5$a$, 5$a$ formed by press-molding a cold rolled steel plate made of an SUS material or an SPCC material. The retainer 5 has a spherical pocket 5$b$ for holding a ball-shaped rolling element formed thereon.

An example of a rolling bearing provided with the retainer for the rolling bearing of the present invention is shown in FIG. 2. FIG. 2 is a sectional view of a grease-enclosed deep groove ball bearing.

A deep groove ball bearing 1 includes an inner ring 2 having an inner ring rolling surface 2a on its peripheral surface, an outer ring 3 concentric with the inner ring 2 and having an outer ring rolling surface 3a on its inner peripheral surface, and a plurality of rolling elements 4 disposed between the inner ring rolling surface 2a and the outer ring rolling surface 3a. A retainer 5 holding the plurality of rolling elements 4 and a sealing member 6 fixed to the outer ring 3 and the like are provided at openings 8a and 8b of the inner ring 2 and the outer ring 3 respectively. The openings 8a and 8b are disposed at an axial end of the inner ring 2 and the outer ring 3 respectively. A grease 7 is essentially enclosed in the periphery of each rolling element 4.

In this embodiment, although the rolling bearing has been described by exemplifying the deep groove ball bearing, the rolling bearing of the present invention can be used as various rolling bearings. The rolling bearing of the present invention can be used as a radial rolling bearing such as an angular ball bearing, a cylindrical roller bearing, a tapered roller bearing, a needle-like roller bearing, an aligning roller bearing; and a thrust rolling bearing such as a thrust ball bearing and a thrust roller bearing.

The retainer which is allowed to have initial rust-preventive performance by chromating it with the trivalent chromium is used for the rolling bearing of the present invention. Thereby, as described above, the rolling bearing is excellent in its rust-preventive performance and does not pollute environment and thus does not contaminate an operator with a hazardous substance when the rolling bearing is cleaned in maintenance. Therefore the rolling bearing is safe and can be widely utilized in an industrial field.

Especially the retainer chromated with the trivalent chromium is preferably utilized as a retainer for the rolling bearing used for a railway vehicle, a motor, a steel mill roll, a machine tool, and the like, because when used for such purposes, rainwater penetrates into the rolling bearing, or the bearing is constantly subjected to hot water and cooling water in a process, and thus the safety is required in the maintenance thereof.

A rolling bearing for a railway vehicle, a motor, a steel mill roll, and a machine tool all provided with the retainer for the rolling bearing of the present invention are described below.

A rolling bearing, for use in the railway vehicle, provided with the retainer for the rolling bearing of the present invention is described below with reference to FIG. 3. FIG. 3 is a sectional view of the bearing for an axle of the railway vehicle.

Both end portions of an axle 9 are supported by a tapered roller bearing 15 mounted on a frame (not shown) of the railway vehicle. The tapered roller bearing 15 includes an inner ring 10, an outer ring 11, a plurality of tapered rollers 12 which are interposed between the inner ring 10 and the outer ring 11 and rotatably roll, an inner ring spacer 14 interposed between the adjacent inner rings 10, and an injection hole 16 for supplying the grease to the tapered roller 12.

A bearing, for use in a roll neck of a rolling machine, provided with the retainer for the rolling bearing of the present invention is described below with reference to FIG. 4. FIG. 4 is a sectional view of the bearing for use in the roll neck of the rolling machine. As shown in FIG. 4, a sealed-type four-row tapered roller bearing 17 mounted on the roll neck of the rolling machine has a pair of inner rings 18 having rolling surfaces 19a, 19b, 19c, and 19d disposed in four rows; a pair of outer rings 20a, 20b having rolling surfaces 21a, 21d disposed in a single row respectively; one outer ring 20c having rolling surfaces 21b, 21c disposed in two rows respectively; tapered rollers 22 rotatably disposed in four rows between the rolling surfaces 19a, 19d, 19b, and 19c of the inner ring 18 and the rolling surfaces 21a, 21d, 21b, and 21c of the outer rings 20a, 20b, and 20c; and a retainer 23 holding tapered rollers 22 circumferentially at predetermined intervals. A sealing member 24 is mounted at both end portions of each of the outer rings 20a, 20b disposed at both sides of the bearing. A large flange 25 is provided at a central portion of each inner ring 18. When the bearing is operated, the tapered rollers 22 roll on the rolling surfaces 19, while the tapered rollers 22 are being guided by the large flange 25.

The tapered rollers 22 are subjected to rolling friction between the rolling surfaces 19a, 19d, 19b, and 19c of the inner ring 18 and the rolling surfaces 21a, 21d, 21b, and 21c of the outer rings, and sliding friction between flange portions 25a, 25b, 25c, 25d, 25e, 25f, 25g, and 25h of the inner ring 18. To reduce the rolling and sliding frictions, the grease for use in the roller bearing is enclosed therein.

The sealing member 24 mounted on the end portion of each of the outer rings 20a, 20b slidingly contacts the outside-diameter surface of the inner ring 18, thus sealing the inside of the bearing. The sealing member 24 includes sealing cases 26a, 26b mounted at the end portion of each of the outer rings 20a, 20b disposed at both sides of the bearing and a contact-type oil seal 28 fitted in an annular groove 27 formed on the inside-diameter portion of each of the sealing cases 26a, 26b.

One example of a rolling bearing for a machine tool using the rolling bearing provided with the retainer for the rolling bearing of the present invention is as described above with reference to FIG. 2 which is a sectional view of a deep groove ball bearing. As the bearing for the machine tool, in addition to the deep groove ball bearing, an angular ball bearing is frequently used.

FIG. 5 shows an example of a motor in which the rolling bearing provided with the retainer for the rolling bearing of the present invention is used. FIG. 5 is a sectional view of the construction of the motor. The motor has a stator 31 consisting of a magnet, for the motor, disposed on the inner peripheral wall of a jacket 30, a rotor 34 on which a coil 33 fixed to a rotating shaft 32 is wound, a commutator 35 fixed to the rotating shaft 32, a brush retainer 36 disposed on an end frame 38 supported by the jacket 30, and a brush 37 accommodated inside the brush retainer 36. The rotating shaft 32 is rotatably supported on the jacket 30 by a bearing 29 such as a ball bearing and a supporting construction for the bearing 29.

As grease to be enclosed in the rolling bearing, in combination of base oils and thickeners, many kinds of grease is used according to the use of the rolling bearing. Various kinds of cleaning liquids are used in dependence on processes of maintenance. It was confirmed that as a result of experiments, in the case of the retainer chromated with trivalent chromium, chromium does not flow out to the grease nor to the cleaning liquid. Therefore it has been found that the chromating with the trivalent chromium is capable of preventing the retainer for the rolling bearing from rusting.

EXAMPLES

Examples 1 and 2

The surface of each retainer, made of SPCC, which is used for a deep groove ball bearing for a main motor of a railway vehicle was plated with zinc to form a primary surface film having a thickness of 10 µm thereon. Thereafter the surface of each retainer was chromated with trivalent chromium to form a secondary surface film having a thickness of 1 µm on each of the retainers. Thereby retainers which do not pollute environment were obtained. In the chromating with trivalent chromium, after the retainers were plated with zinc, they were cleaned with water and immersed in a nitric acid solution. After they were cleaned with water again, they were immersed in a trivalent chromium bath and dried.

Comparative Example 1

Except that the hexavalent chromium is used in chromating instead of the trivalent chromium, the same retainer as that of the example 1 was obtained.

The rust-preventive performance and the elution amount of chromium to grease and a cleaning liquid in the retainers of the examples 1, 2, and the comparative example 1 were measured by using the following test method. Table 1 shows the results of the tests.

(1) Test for Examining Rust-Preventive Performance

By using the retainers, a test for examining the rust-preventive performance specified in JIS Z 2371 was conducted under the following conditions. The period of time it took for the surface of each retainer to rust was measured.

[Test Condition]
Temperature inside an injector: 35±1° C.
Temperature of air saturator: 35±1° C.
Concentration of salt solution: 5±0.1 wt %
Pressure of supplied air: 98±10 kPa
Amount of injected and collected liquid: 1.0 to 2.0 ml/h/80 $cm^2$.
pH of injected and collected liquid at 34±1° C.: 6.5 to 7.2
Density of injected and collected liquid at 20° C.: 1.0268 to 1.0410 $g/cm^3$.

(2) Test for Examining Elution of Chromium to Grease

Each retainer was immersed in eight kinds of commercially available grease shown in table 1 to measure the elution amount of chromium.

[Test Condition]
Immersion temperature: temperature of bearing was set to 120° C., supposing that main motor was in operation at 120° C.
Immersion period of time: 500 hours
Evaluation method: measurement of the elution amount of the chromium by using fluorescent X-rays and visual check of the external appearance (3) Test for Examining Elution of Chromium to Cleaning Liquid Each retainer was immersed in three kinds of commercially available cleaning liquids shown in table 1 to measure the elution amount of chromium.

[Test Condition]
Immersion temperature: normal temperature
Immersion period of time: 500 hours
Evaluation method: measurement of the elution amount of chromium by using fluorescent X-rays and visual check of the external appearance

TABLE 1

|  | Example | | Comparative |
| --- | --- | --- | --- |
|  | 1 | 2 | example 1 |
| Test for examining rust-preventive performance | | | |
| Time taken for white rust to appear (h) | 240 | 1224 | 432 |
| Time taken for red rust to appear (h) | 360 | 1464 | 792 |
| Test for examining elution of chromium to grease | | | |
| Elution to Unimax R2 *[1]) | None | None | None |
| Elution to Unimax SR2 *[2]) | None | None | None |
| Elution to Unimax R300 *[3]) | None | None | None |
| Elution to FG-13 *[4]) | None | None | None |
| Elution to MK-8 *[5]) | None | None | None |
| Elution to Multinoc Grease *[6]) | None | None | None |
| Elution to Mobilis SHC100 *[7]) | None | None | None |
| Elution to Alvania S3 *[8]) | None | None | None |
| Test for examining elution of chromium to cleaning liquid | | | |
| Elution to Clean Solvwnt *[9]) | None | None | None |
| Elution to Seikurin #100,500 *[10]) | None | None | Peel-off occurred *[12]) |
| Elution to C-800 *[11]) | None | None | None |

(Manufacturer of grease)
*[1]) Kyodo Yushi Co., Ltd.
*[2]) Kyodo Yushi Co., Ltd.
*[3]) Kyodo Yushi Co., Ltd.
*[4]) Nippon Koyu Ltd.
*[5]) Nippon Koyu Ltd.
*[6]) Nippon Oil Corporation
*[7]) Exon Mobil Corporation
*[8]) Showa Shell Sekiyu K.K.
(Manufacturer of cleaning liquid)
*[9]) Taiyo Kagaku Co., Ltd.
*[10]) Seiwa Shoji Co., Ltd.
*[11]) Yamaichi Chemical Industries Co., Ltd.
*[12]) Yellow chromate coating peeled off
(Base oil or thickener)
Lithium complex
Ether type synthetic oil
Lithium complex
Urea
Urea
Mineral oil
Lithium complex soap
Lithium soap In the rust-preventive performance, the retainer of the example 2 was superior to that of the comparative example 1, which is a current retainer.

In each retainer, there was no sign of the elution of the chromium to all of the eight kinds of grease after the retainer was immersed therein. This indicates that if the hexavalent chromium is replaced by the trivalent chromium, it can be judged that the chromium does not elute to the grease.

Neither was there any signs of the elution of the chromium to all of the three kinds of cleaning liquids after the retainer was immersed therein. But in the visual check of the external appearance after immersed in Seikurin #100, 500, yellow chromate coating which is hexavalent chromium peeled off the retainer of the comparative example 1. Thus there is a possibility that the chromium flowed out. The elution amount of the chromium was slight, whereas the absolute amount of the cleaning liquid was large. Thus the reason why the chromium could not be detected is, conceivably, that the concentration of the chromium in the cleaning liquid was below the lower limit of detection.

(4) Test for Examining Elution of Chromium to Cleaning Liquid

By using the retainer of each of the examples 1, 2 and the comparative example 1, test bearings were prepared. Unimax R No. 2 was used as the grease. In the condition in which the rotational speed was set to $5370/cm^{-1}$ and the vibration frequency was set to 70 Hz to 120 Hz, a rotational vibration test was conducted for 450 hours. As a result, in the bearings of the examples 1, 2 and the comparative example 1, there was no difference in the temperature rise during the rotational vibration test. After the elapse of 450 hours, iron, chromium, and water content contained in the grease were measured. As a result, there was no difference among the bearings of the examples 1, 2 and the comparative example 1.

Industrial Applicability

Because the retainer for the rolling bearing of the present invention does not contain the hazardous hexavalent chromium, the hazardous hexavalent chromium does not elute from the rolling bearing provided with the retainer and thus the rolling bearing does not pollute environment. Therefore the rolling bearing of the present invention can be preferably utilized widely for industrial machines in manufacturing, building, transportation, and service industries.

Figure 1:
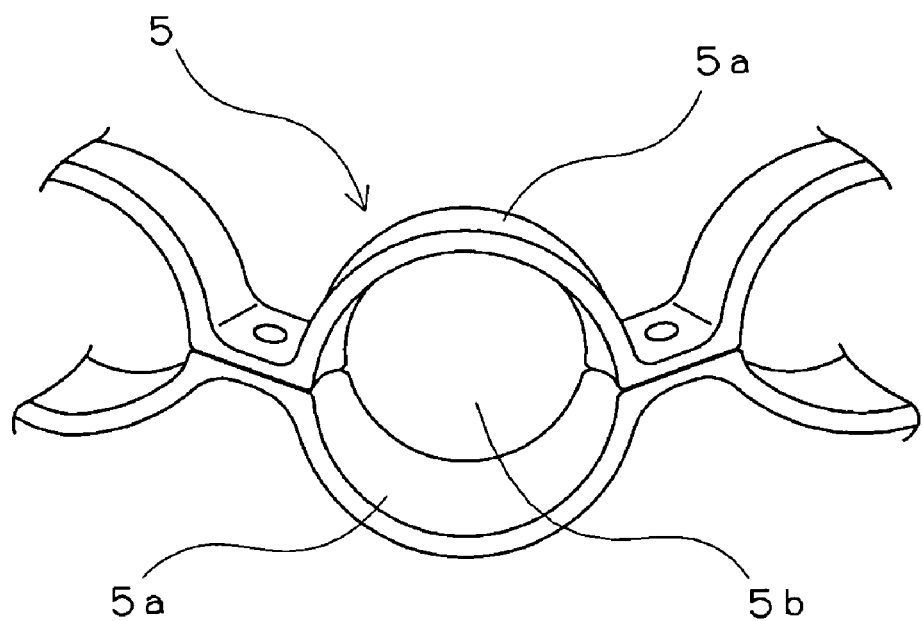
FIG. 1 is partially enlarged perspective view of a corrugated iron plate retainer.
Figure 2:
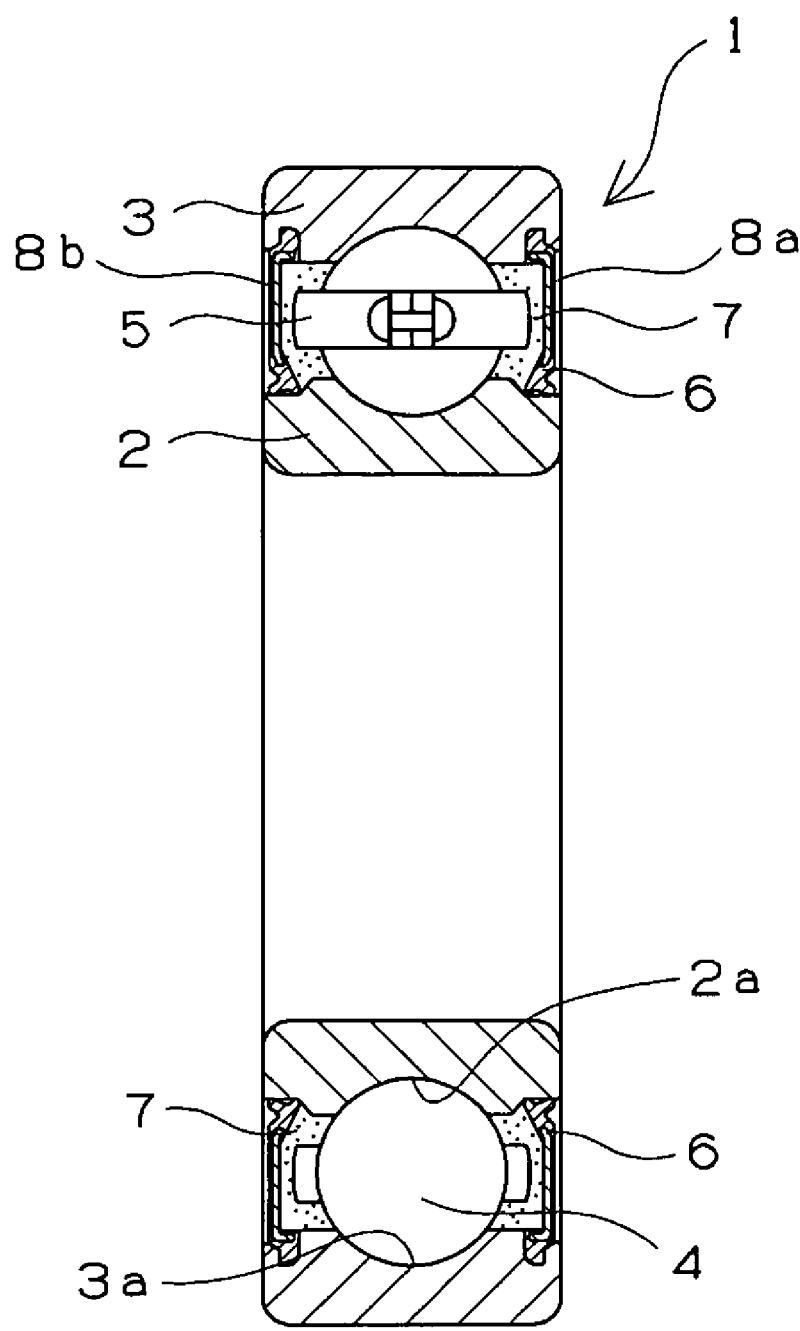
FIG. 2 is a sectional view of a grease-enclosed deep groove ball bearing.
Figure 3:
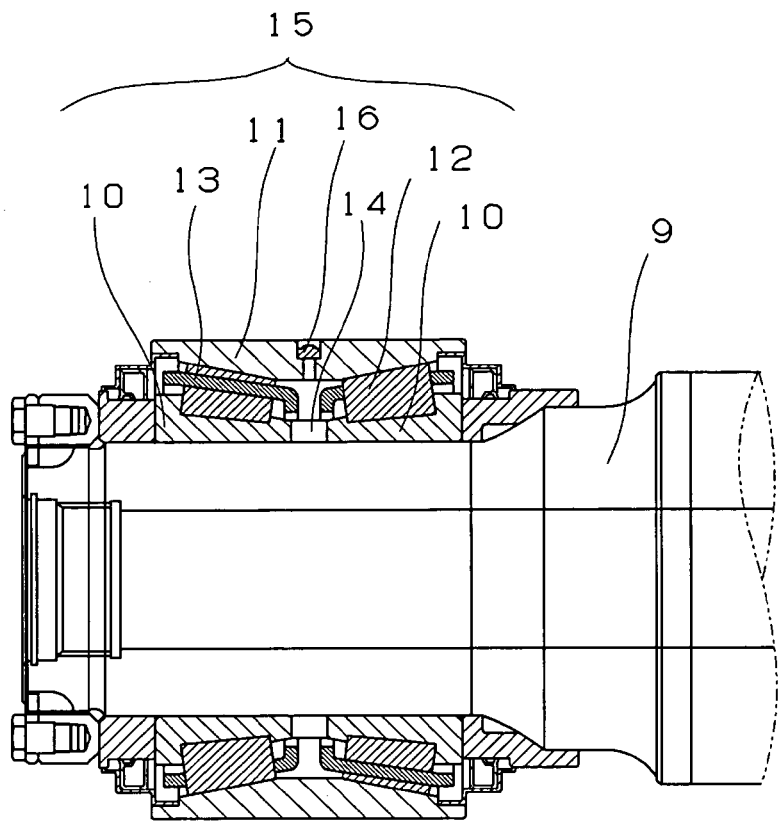
FIG. 3 is a sectional view of the bearing for an axle of a railway vehicle.
Figure 4:
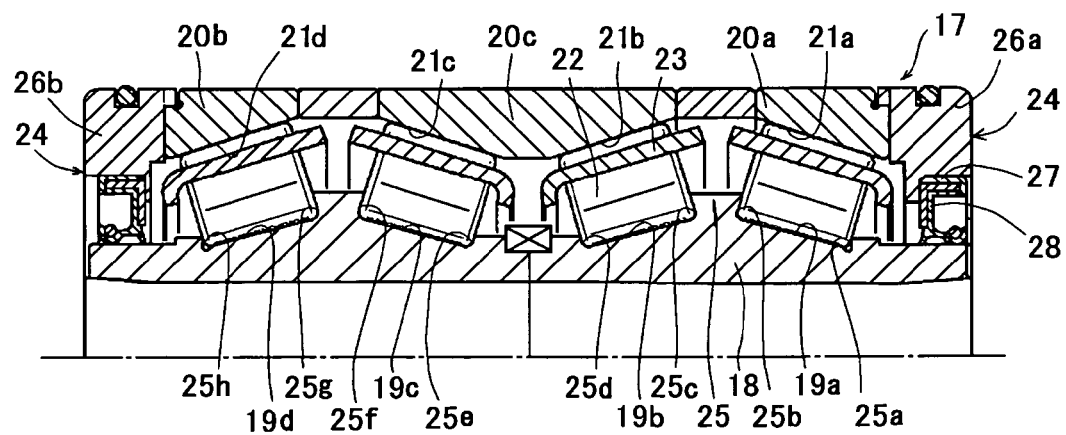
FIG. 4 is a sectional view of the bearing for use in the roll neck of s rolling machine.
Figure 5:
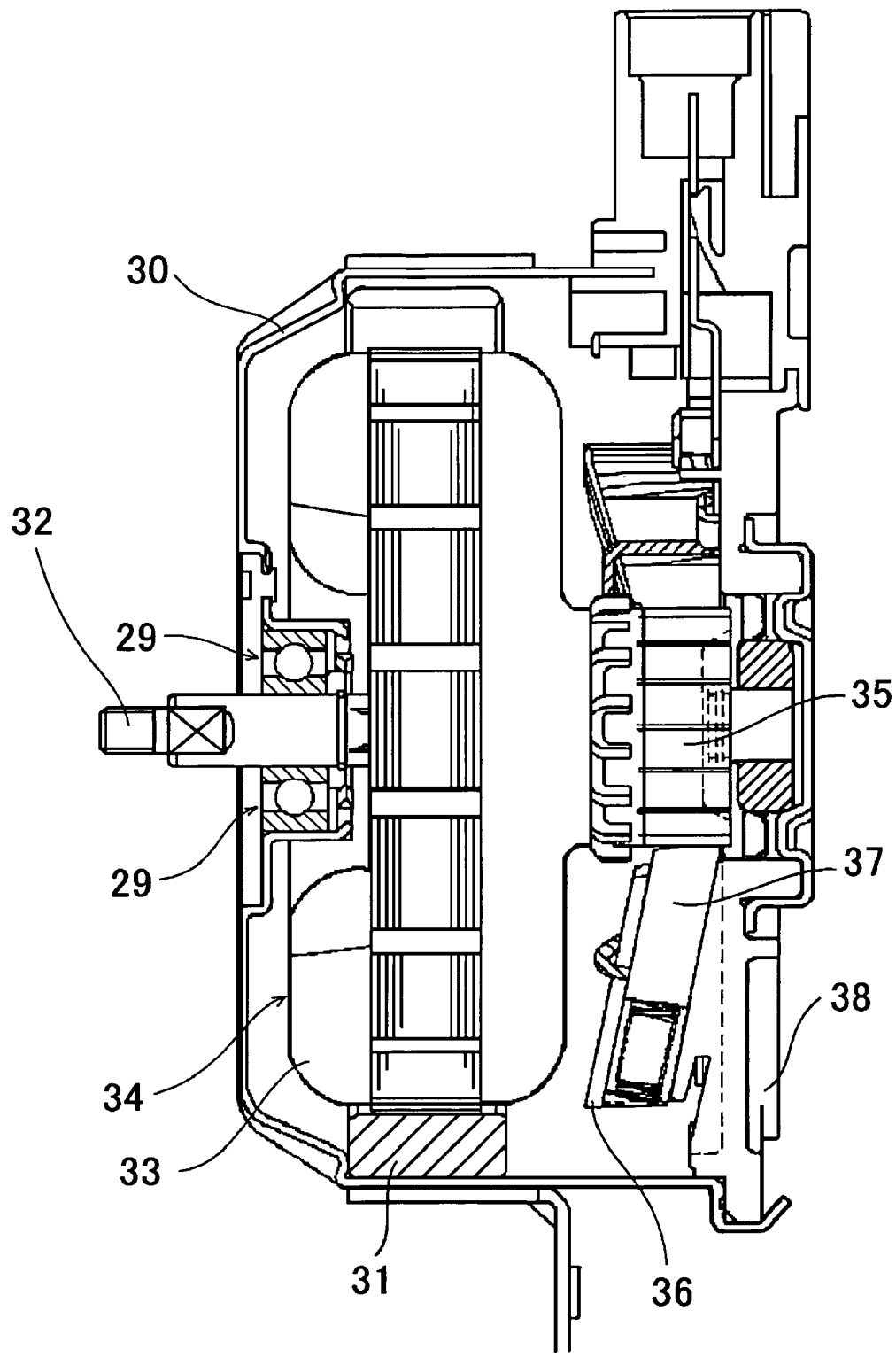
FIG. 5 is a sectional view of the construction of a motor which is one example of the present invention.

| EXPLANATION OF REFERENCE NUMERALS AND SYMBOLS | |
|---|---|
| 1: | deep groove ball bearing |
| 2: | inner ring |
| 3: | outer ring |
| 4: | rolling element |
| 5: | retainer |
| 6: | sealing member |
| 7: | grease |
| 8a: | opening |
| 8b: | opening |
| 9: | axle |
| 10: | inner ring |
| 11: | outer ring |
| 12: | tapered roller |
| 13: | retainer |
| 14: | inner ring spacer |
| 15: | tapered roller bearing |
| 16: | injection hole |
| 17: | tapered roller bearing |
| 18: | inner ring |
| 19: | rolling surface |
| 20: | outer ring |
| 21: | rolling surface |
| 22: | tapered roller |
| 23: | retainer |
| 24: | sealing member |
| 25: | large flange |
| 26: | sealing case |
| 27: | annular groove |
| 28: | contact-type oil seal |
| 29: | rolling bearing |
| 30: | jacket |
| 31: | stator |
| 32: | rotating shaft |
| 33: | coil |
| 34: | rotor |
| 35: | commutator |

| EXPLANATION OF REFERENCE NUMERALS AND SYMBOLS | |
|---|---|
| 36: | brush retainer |
| 37: | brush |
| 38: | end frame |

The invention claimed is:

1. A metal retainer for a rolling bearing which retains rolling elements of said rolling bearing, a grease having a lithium soap, a lithium complex soap or a urea compound as a thickener or a grease having an ether type synthetic oil or a mineral oil as a base oil being enclosed in said rolling bearing wherein said metal is a cold rolled steel, a surface of which is chromated with trivalent chromium after rust-preventive treatment is applied to said surface thereof; and said chromating with said trivalent chromium is a surface treatment performed by cleaning said cold rolled steel with water after said rust-preventive treatment, immersing said cold rolled steel in a solution of nitric acid, cleaning said cold rolled steel with water again, immersing said cold rolled steel in a trivalent chromium bath, and drying said cold rolled steel.

2. The retainer for the rolling bearing according to claim 1, wherein said rust-preventive treatment is at least one kind of surface treatment selected from among electrogalvanizing, electrotinning, electrolytic tin-zinc alloy plating, electrolytic zinc-iron alloy plating, and electrolytic zinc-nickel alloy plating.

3. The retainer for the rolling bearing according to claim 2, wherein said surface treatment is electrogalvanizing.

4. The retainer for the rolling bearing according to claim 2, wherein an average coating weight of a film formed on one surface of said cold rolled steel plate when said rust-preventive treatment is carried out is 2 to 25 $g/m^2$.

5. The retainer for the rolling bearing according to claim 2, wherein surface roughness Ra of a metal plate obtained by performing said rust-preventive treatment on said cold rolled steel plate is 0.2 to 1.5 μm.

6. A rolling bearing comprising an inner ring having a rolling surface on a peripheral surface thereof, an outer ring concentric with said inner ring and having a rolling surface on an, inner peripheral surface thereof, and a plurality of rolling elements disposed between said inner and outer ring rolling surfaces; and a retainer holding said plurality of rolling elements, a grease having a lithium soap, a lithium complex soap or a urea compound as a thickener or a grease having an ether type synthetic oil or a mineral oil as a base oil being enclosed in said rolling bearing wherein said retainer is a metal retainer wherein said metal is a cold rolled steel, a surface of which is chromate with trivalent chromium after rust-preventive treatment is applied to said surface thereof; and said chromatin with said trivalent chromium is a surface treatment performed by cleaning said cold rolled steel with water after said rust-preventive treatment, immersing said cold rolled steel in a solution of nitric acid, cleaning said cold rolled steel with water again, immersing said cold rolled steel in a trivalent chromium, bath, and drying said cold rolled steel.

7. The rolling bearing according to claim 6, which is used for industrial machines.

8. The rolling bearing according to claim 7, wherein said industrial machines include a railway vehicle, a steel rolling machine, a machine tool, and a motor.

* * * * *